United States Patent
Yamazaki et al.

(10) Patent No.: US 9,705,385 B2
(45) Date of Patent: Jul. 11, 2017

(54) PRODUCT SPECIFICATION SETTING APPARATUS AND FAN MOTOR HAVING THE SAME

(71) Applicant: SANYO DENKI CO., LTD., Tokyo (JP)

(72) Inventors: Tetsuya Yamazaki, Tokyo (JP); Takahisa Toda, Tokyo (JP)

(73) Assignee: SANYO DENKI CO., LTD., Tokyo (JP)

(*) Notice: Subject to any disclaimer, the term of this patent is extended or adjusted under 35 U.S.C. 154(b) by 98 days.

(21) Appl. No.: 14/728,510

(22) Filed: Jun. 2, 2015

(65) Prior Publication Data

US 2015/0357887 A1 Dec. 10, 2015

(30) Foreign Application Priority Data

Jun. 4, 2014 (JP) .................................. 2014-115981

(51) Int. Cl.
| | | |
|---|---|---|
| *H05K 7/20* | (2006.01) | |
| *H02K 11/00* | (2016.01) | |
| *H02P 31/00* | (2006.01) | |
| *G06Q 10/08* | (2012.01) | |
| *G06F 1/20* | (2006.01) | |
| *H02P 6/00* | (2016.01) | |

(52) U.S. Cl.
CPC .......... *H02K 11/0078* (2013.01); *G06F 1/20* (2013.01); *G06Q 10/08* (2013.01); *H02P 31/00* (2013.01); *H02P 6/00* (2013.01)

(58) Field of Classification Search
CPC ...... H02P 3/00; H02P 3/18; H02P 6/00; H02P 6/06; H02P 23/00; H02P 25/00; H02P 27/00; G05B 11/28

USPC .......... 318/400.01, 700, 701, 727, 599, 800, 318/811, 432, 400.12; 361/695; 700/300; 712/26, 27

See application file for complete search history.

(56) References Cited

U.S. PATENT DOCUMENTS

| | | | | |
|---|---|---|---|---|
| 6,671,459 B1 * | 12/2003 | Bultman | ............. | H02P 23/0077 318/432 |
| 7,227,748 B2 * | 6/2007 | Garnett | ............. | H05K 7/20172 361/679.31 |
| 7,605,556 B2 * | 10/2009 | Frankel | ............. | H05K 7/20209 318/400.07 |
| 8,374,716 B1 * | 2/2013 | Frankel | .................. | G05B 15/02 388/804 |

(Continued)

FOREIGN PATENT DOCUMENTS

| | | |
|---|---|---|
| JP | 2008-072794 | 3/2008 |
| JP | 2009-302956 | 12/2009 |

OTHER PUBLICATIONS

Extended European Search Report dated Sep. 18, 2015 issued in the corresponding European patent application No. 15170255.2.

*Primary Examiner* — Antony M Paul
(74) *Attorney, Agent, or Firm* — Rankin, Hill & Clark LLP

(57) ABSTRACT

A product specification setting apparatus includes: an electronic tag for updatably storing specifications of a product; and a control computer for controlling the product according to the stored specifications. A fan motor includes: a motor driving unit for driving a motor for rotating a fan; an electronic tag for updatably storing specifications of the fan motor; and a control computer for controlling the motor driving unit according to the stored specifications.

12 Claims, 7 Drawing Sheets

(56) References Cited

U.S. PATENT DOCUMENTS

| | | | |
|---|---|---|---|
| 9,188,355 B1* | 11/2015 | Allen | F24F 11/0001 |
| 2003/0080709 A1* | 5/2003 | Hornberger | H02P 6/06 |
| | | | 318/700 |
| 2007/0063600 A1 | 3/2007 | Fujii et al. | |
| 2007/0152613 A1* | 7/2007 | Mullin | F04D 27/004 |
| | | | 318/432 |
| 2009/0171786 A1 | 7/2009 | Kuo et al. | |
| 2010/0019627 A1 | 1/2010 | Fujii et al. | |
| 2015/0012140 A1* | 1/2015 | Fang | G05B 19/0421 |
| | | | 700/275 |

* cited by examiner

FIG. 4

OPERATION PROGRAM

SPEED CONTROL PROGRAM
X=0: SINGLE SPEED CONTROL PROGRAM
X=1: PWM CONTROL PROGRAM
X=2: TEMPERATURE VARIABLE SPEED CONTROL PROGRAM

SENSOR PROGRAM
Y=a: PULSE SENSOR APPLICATION PROGRAM
Y=b: LOW SPEED SENSOR APPLICATION PROGRAM
Y=c: LOCK SENSOR APPLICATION PROGRAM

ROTATION SPEED PROGRAM
Z=$\alpha$: 5000rpm CONTROL PROGRAM
Z=$\beta$: 3500rpm CONTROL PROGRAM
Z=$\gamma$: 2000rpm CONTROL PROGRAM

PRODUCT SPECIFICATION SETTING APPARATUS AND FAN MOTOR HAVING THE SAME

CROSS-REFERENCE TO RELATED APPLICATION

This application claims priority from Japanese Patent Application No. 2014-115981 filed with the Japan Patent Office on Jun. 4, 2014, the entire content of which is hereby incorporated by reference.

BACKGROUND

1. Technical Field

The present disclosure relates to a product specification setting apparatus and a fan motor having the same.

2. Description of the Related Art

For example, controllers of various products include substrates therein of which heat needs to be radiated. Therefore, each product is provided with a fan motor for circulating air through the inside of the controller.

The amount of heat that needs to be radiated by a fan motor varies depending on the amount of heat generated on the substrate included in the controller.

Therefore, as the fan motors belonging to the same series (group) of products, there are provided products having specifications including the different rotation speed of a fan, the different type of a sensor to be used, and/or the different type of a speed control.

For example, as fan motors belonging to the same series of products having the same longitudinal and lateral dimensions, the same thickness, the same fan type, and the same rated voltage, as many as 30 kinds of products each having the different fan speed, the different type of a sensor to be used, and/or the different type of a speed control are provided.

Thus, with conventional techniques, as many as 30 kinds of products are manufactured and kept in stock in a warehouse with a stock control.

According to a technique disclosed in JP-A-2008-72794, it is possible to alter a control program written in an internal memory provided on a circuit board of a fan motor. By using this technique, it is possible to modify the specifications of the fan motor at the time of shipping in order to meet the requests of the client (purchaser).

SUMMARY

A product specification setting apparatus includes: an electronic tag for updatably storing specifications of a product; and a control computer for controlling the product according to the stored specifications.

A fan motor includes: a motor driving unit for driving a motor for rotating a fan; an electronic tag for updatably storing specifications of the fan motor; and a control computer for controlling the motor driving unit according to the stored specifications.

BRIEF DESCRIPTION OF THE DRAWINGS

FIG. 4 illustrates fan motor operation programs included in an operation program constructing unit;

DESCRIPTION OF THE EMBODIMENTS

Figure 1:
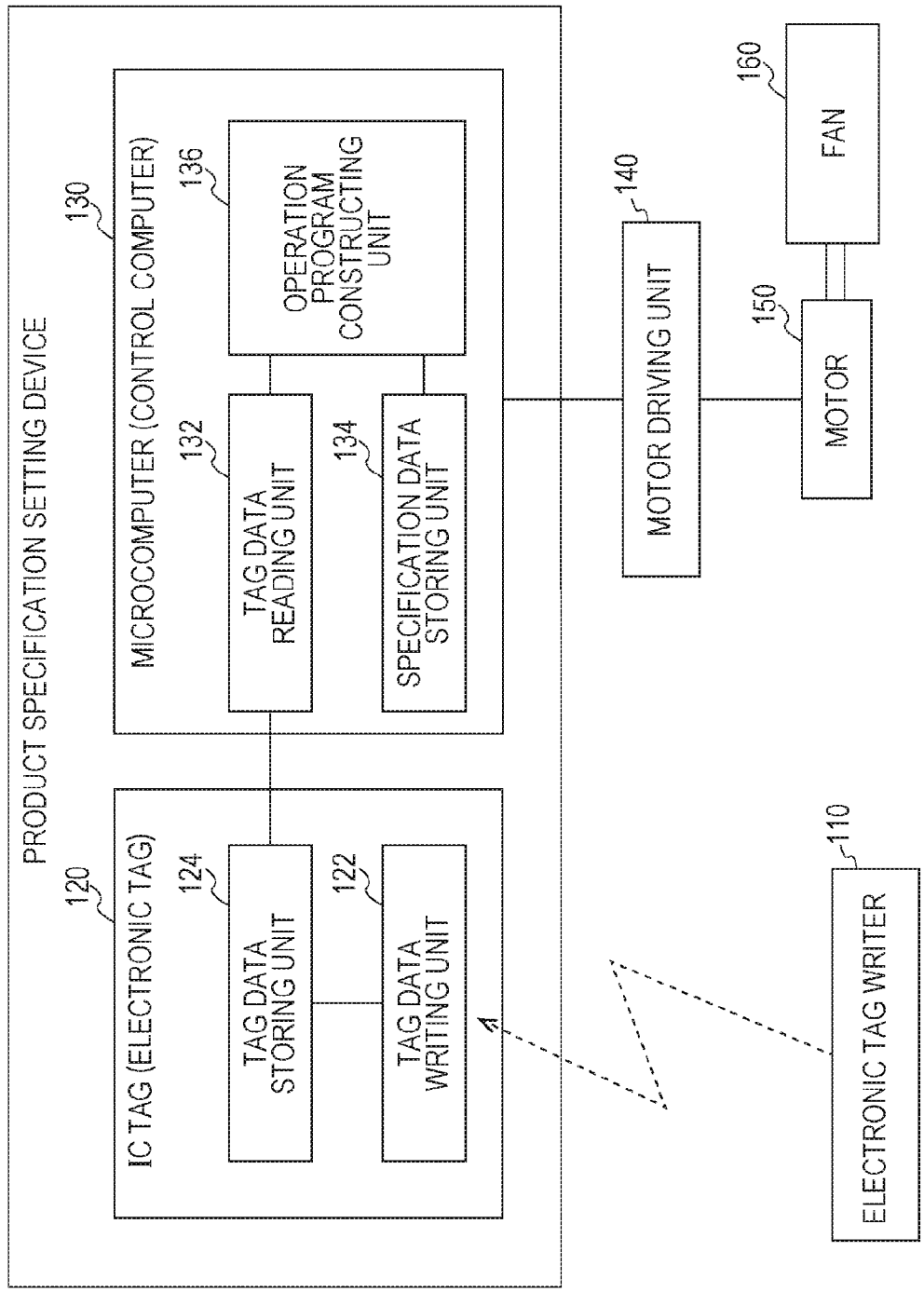
FIG. 1 is a block diagram illustrating a fan motor control system according to the present embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Using the technique described in JP-A-2008-72794, it is possible to reduce the amount of stock of fan motors of the series. With this technique, however, the control program needs to be altered for each fan motor. Therefore, the stock control is not easy.

One object of the present disclosure is to provide a product specification setting apparatus with which it is possible to reduce the amount of stock and make the stock control easier, and a fan motor having the same.

A product specification setting apparatus according to an embodiment of the present disclosure includes: an electronic tag for updatably storing specifications of a product; and a control computer for controlling the product according to the stored specifications.

A fan motor according to an embodiment of the present disclosure includes: a motor driving unit for driving a motor for rotating a fan; an electronic tag for updatably storing specifications of the fan motor; and a control computer for controlling the motor driving unit according to the stored specifications.

With a product specification setting apparatus and a fan motor configured as described above, it is possible to set the specifications of a product or a fan motor by using specifications stored in an electronic tag that is easily rewritable from outside. Therefore, it is possible to reduce the amount of stock of products or fan motors in the form of hardware. Moreover, the reduction of the amount of stock makes the stock control easier.

Next, a product specification setting apparatus and a fan motor having the same according to an embodiment of the present disclosure will be described with reference to the drawings. Note that a fan motor of the present embodiment includes a product specification setting apparatus of the present embodiment. A fan motor according to the present embodiment will be illustrated below.

[Configuration of Fan Motor]

FIG. 1 is a block diagram illustrating a control system of a fan motor 100 according to the present embodiment. The fan motor 100 includes an electronic tag writer 110, an IC tag (electronic tag) 120, a microcomputer (control computer) 130, a motor driving unit 140, a motor 150, and a fan 160.

The electronic tag writer 110, the IC tag 120, and the microcomputer 130 together form a product specification setting apparatus. The IC tag 120 updatably stores specifications (data regarding the specifications; tag data) of the fan motor 100 as a product. The microcomputer 130 uses the specifications (tag data) of the fan motor 100 stored in the IC tag 120 to control the motor driving unit 140 and the motor 150 based on the specifications.

The electronic tag writer 110 outputs the specifications of the fan motor 100 to the IC tag 120 (a tag data writing unit 122) in order to update the specifications of the fan motor 100 stored in the IC tag 120.

The IC tag 120 updatably stores the specifications of the fan motor 100. The IC tag 120 includes the tag data writing unit 122 and a tag data storing unit 124.

The tag data writing unit 122 writes, to the tag data writing unit 122 itself, the specifications of the fan motor 100 output from the electronic tag writer 110. In the present embodiment, the specifications of the fan motor 100 are wirelessly output from the electronic tag writer 110 to the tag data writing unit 122. Alternatively, the specifications of the fan motor 100 may be output via a wired connection.

The tag data writing unit 122 may be configured to be input the specifications of the fan motor 100 from another device other than the electronic tag writer 110 and write the input specifications to the tag data writing unit 122 itself. That is, the tag data writing unit 122 may be configured to write, to the tag data writing unit 122 itself, the specifications of the fan motor 100 input from outside.

The tag data storing unit 124 stores the specifications of the fan motor 100 written in the tag data writing unit 122.

The specifications of the fan motor 100 output from the electronic tag writer 110, the specifications of the fan motor 100 written by the tag data writing unit 122 to the tag data writing unit 122 itself, and the specifications of the fan motor 100 stored in the tag data storing unit 124 are output, written and stored as tag data. Specific examples of tag data will be described later.

The microcomputer 130 controls the fan motor 100 based on the specifications of the fan motor 100 stored in the IC tag 120. The microcomputer 130 includes a tag data reading unit 132, a specification data storing unit 134, and an operation program constructing unit 136.

The tag data reading unit 132 reads tag data stored in the tag data storing unit 124 of the IC tag 120. The specification data storing unit 134 stores specification data corresponding to the tag data.

The operation program constructing unit 136 fetches, from the specification data stored in the specification data storing unit 134, specification data corresponding to the tag data read by the tag data reading unit 132. The operation program constructing unit 136 constructs an operation program for the fan motor 100 by using the fetched specification data.

The motor driving unit 140 rotates the fan 160 by driving the motor 150 under a control of the microcomputer 130 based on the specifications of the fan motor 100. That is, the motor driving unit 140 drives the motor 150 for rotating the fan 160 under a control of the microcomputer 130 based on the specifications of the fan motor 100. That is, the microcomputer 130 controls the motor driving unit 140 for driving (controlling) the motor 150 for rotating the fan 160 based on the specifications of the fan motor 100.

For example, the microcomputer 130 controls the motor driving unit 140 by an operation program based on the specifications of the fan motor 100. In this case, the motor driving unit 140 may drive (control) the motor 150 by using the operation program constructed by the microcomputer 130 (the operation program constructing unit 136).

Figure 2:
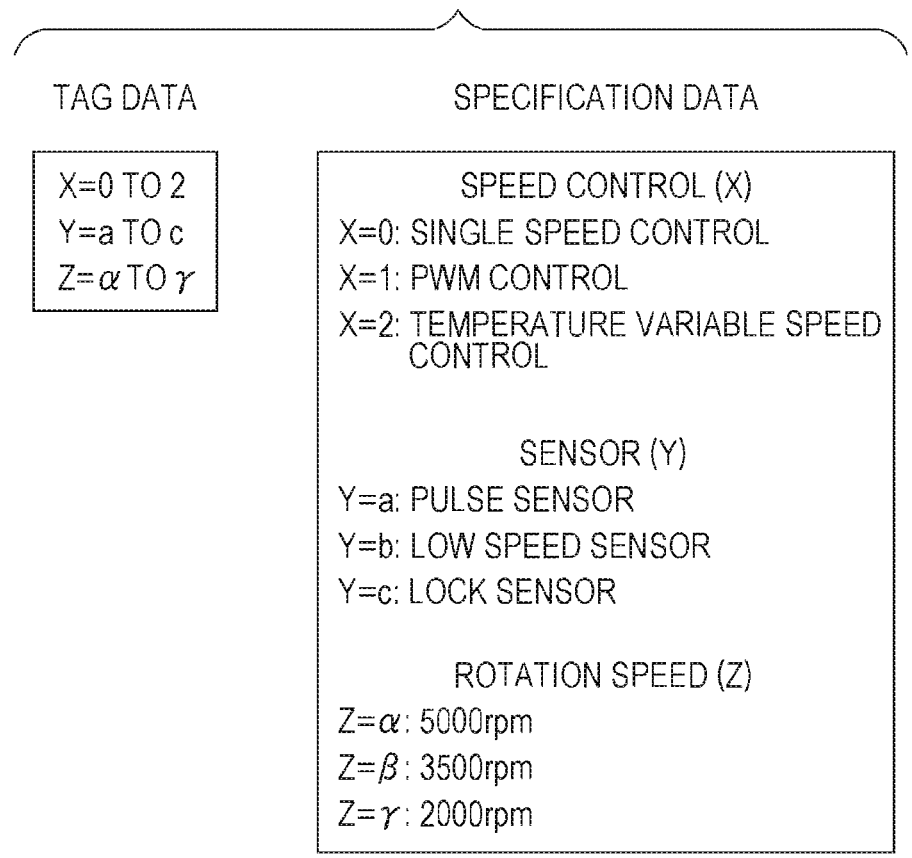
FIG. 2 illustrates tag data stored in a tag data storing unit, and specification data stored in a specification data storing unit.

FIG. 2 illustrates tag data stored in the tag data storing unit 124, and specification data stored in the specification data storing unit 134.

As illustrated in FIG. 2, tag data is a combination of X, Y and Z. The ranges of X, Y and Z are X=0 to 2, Y=a to c, and Z=α to γ, for example. The tag data is expressed as X=1, Y=a, and Z=β, for example.

As illustrated in FIG. 2, specification data includes three specifications: the speed control (X) applied to the fan motor 100, the sensor (Y) used in the fan motor 100, and the rotation speed (Z) applied to the fan motor 100. As an example, the present embodiment illustrates specification data including all of these three specifications. Note however that the specification data may only include at least one of the three specifications.

The specification of the speed control (X) applied to the fan motor 100 includes three control contents: a single speed control which is expressed as tag data X=0, a PWM control which is expressed as tag data X=1, and a temperature variable speed control which is expressed as tag data X=2 (for example, a control to making speed variable according to the temperature). As an example, the present embodiment illustrates the specification of the speed control (X) including all of these three control contents. Note however that the specification of the speed control (X) may only include at least one of the three control contents.

The specification of the sensor (Y) used in the fan motor 100 includes three sensor uses: the pulse sensor expressed as Y=a, the low speed sensor expressed as Y=b, and the lock sensor expressed as Y=c. As an example, the present embodiment illustrates the specification of the sensor (Y) including all of these three sensor uses. Note however that the specification of the sensor (Y) may only include at least one of the three sensor uses.

The specification of the rotation speed (Z) applied to the fan motor 100 includes three rotation speed values: 5000 rpm (high speed) expressed as Z=α, 3500 rpm (medium speed) expressed as Z=β, and 2000 rpm (low speed) expressed as Z=γ. As an example, the present embodiment illustrates the specification of the rotation speed (Z) including all of these three rotation speed values. Note however that the specification of the rotation speed (Z) may only include at least one of the three rotation speed values.

Figure 3:
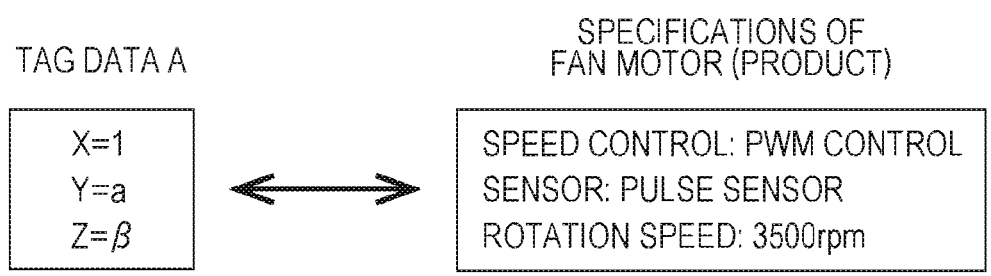
FIG. 3 illustrates a correlation between tag data and the specifications of a product.

FIG. 3 illustrates a correlation between tag data and the specifications of the fan motor 100. As illustrated in FIG. 3, tag data A defines X=1, Y=a, and Z=β. In this case, the specifications of the fan motor 100 (product) are as follows: the speed control content is the PWM control, the sensor to be used is the pulse sensor, and the rotation speed is 3500 rpm.

FIG. 4 illustrates operation programs for the fan motor 100 provided in the operation program constructing unit 136.

The operation program constructing unit 136 links three programs each other: a speed control program, a sensor program, and a rotation speed program, as operation programs. As speed control programs, the operation program constructing unit 136 includes a single speed control program, a PWM control program, and a temperature variable speed control program. As sensor programs, the operation program constructing unit 136 includes a pulse sensor application program, a low speed sensor application program, and a lock sensor application program. As rotation speed programs, the operation program constructing unit 136 has a 5000 rpm control program, a 3500 rpm control program, and a 2000 rpm control program.

Figure 5:
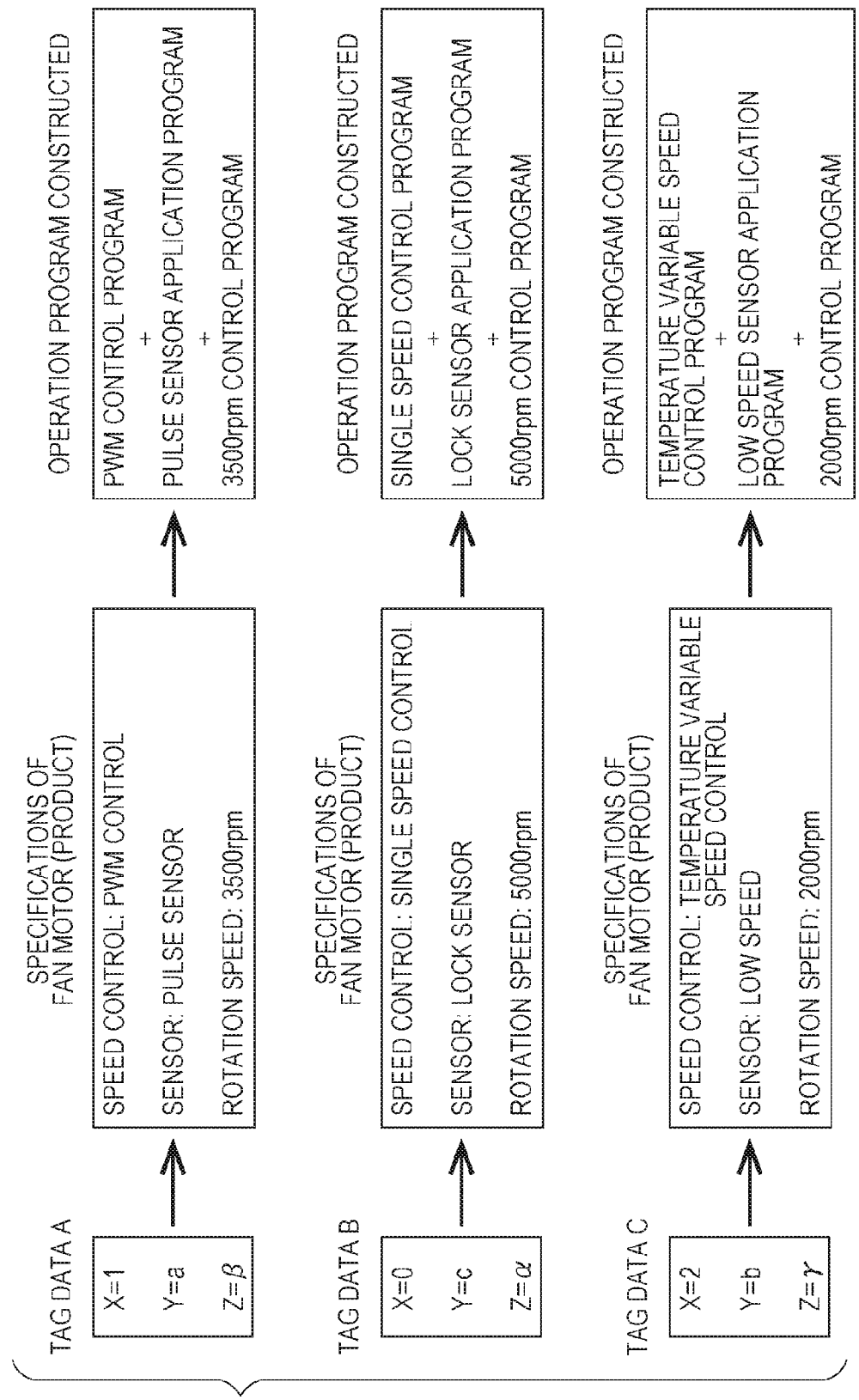
FIG. 5 illustrates operation programs to be constructed from tag data.

FIG. 5 illustrates operation programs to be constructed from tag data. Assume that tag data A (X=1, Y=a, and Z=β) is stored in the tag data storing unit 124. In this case, the operation program constructing unit 136 fetches, from the specification data storing unit 134, the specifications of the fan motor 100 (product) corresponding to tag data A. Specifically, a PWM control as the speed control, a pulse sensor as the sensor to be used, and 3500 rpm as the rotation speed are fetched as the specifications of the fan motor 100 (product). As an operation program corresponding to the fetched specifications of the fan motor 100 (product), the operation program constructing unit 136 constructs an operation program including PWM control program+pulse sensor application program+3500 rpm control program.

Now assume that tag data B (X=0, Y=c and Z=α) is stored in the tag data storing unit 124. In this case, the operation program constructing unit 136 fetches, from the specification data storing unit 134, the specifications of the fan motor 100 (product) corresponding to tag data B. Specifically, a single speed control as the speed control, a lock sensor as the sensor to be used, and 5000 rpm as the rotation speed are fetched as the specifications of the fan motor 100 (product). As an operation program corresponding to the fetched specifications of the fan motor 100 (product), the operation program constructing unit 136 constructs an operation program including single speed control program+lock sensor application program+5000 rpm control program.

Now assume that tag data C (X=2, Y=b and Z=γ) is stored in the tag data storing unit 124. In this case, the operation program constructing unit 136 fetches, from the specification data storing unit 134, the specifications of the fan motor 100 (product) corresponding to tag data C. Specifically, a temperature variable speed control as the speed control, a low speed sensor as the sensor to be used, and 2000 rpm as the rotation speed are fetched as the specifications of the fan motor 100 (product). As an operation program corresponding to the fetched specifications of the fan motor 100 (product), the operation program constructing unit 136 constructs an operation program including temperature variable speed control program+low speed sensor application program+2000 rpm control program.

As described above, with the fan motor 100 according to the present embodiment, the electronic tag writer 110 outputs the specifications of the fan motor 100 as tag data. Thus, many specifications (3×3×3=27 specifications in the present embodiment) can be implemented for the fan motor 100.

[Operation of Fan Motor]

<Process of Writing Tag Data to IC Tag>

Figure 6:
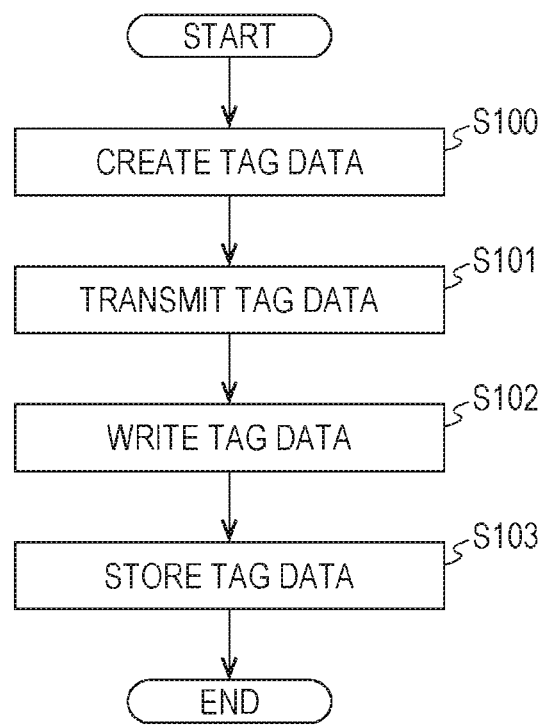
FIG. 6 is an operation flow chart illustrating a process performed between an electronic tag writer and an IC tag.

FIG. 6 is an operation flow chart illustrating a process performed between the electronic tag writer 110 and the IC tag 120 (see FIG. 1).

The operator checks specifications to be set in the fan motor 100, and creates (sets), in the electronic tag writer 110, tag data corresponding to the specifications (step S100). For example, where such specifications as illustrated in FIG. 3 are to be set, the operator creates tag data A corresponding to X=1, Y=a and Z=β.

The operator transmits tag data A which has been set in the electronic tag writer 110 (step S101). Tag data A is transmitted to the tag data writing unit 122.

The tag data writing unit 122 writes, to the tag data writing unit 122 itself, tag data A which has been transmitted thereto (step S102).

The tag data storing unit 124 stores tag data A which has been written in the tag data writing unit 122 (step S103). The tag data storing unit 124 stores the tag data by an overwriting updating operation.

By the process described above, tag data A corresponding to a PWM control as the speed control, a pulse sensor as the sensor to be used, and 3500 rpm as the rotation speed, is stored in the tag data storing unit 124 as the specifications of the fan motor 100. Thus, these specifications are set as the specifications of the fan motor 100.

Note that when tag data B illustrated in FIG. 5 is transmitted from the electronic tag writer 110, the tag data B corresponding to a single speed control as the speed control, a lock sensor as the sensor to be used, and 5000 rpm as the rotation speed is stored in the tag data storing unit 124 as the specifications of the fan motor 100. Thus, these specifications are set as the specifications of the fan motor 100. When tag data C illustrated in FIG. 5 is transmitted from the electronic tag writer 110, the tag data C corresponding to a temperature variable speed control as the speed control, a low speed sensor as the sensor to be used, and 2000 rpm as the rotation speed is stored in the tag data storing unit 124. Thus, these specifications are set as the specifications of the fan motor 100.

<Process of Constructing Operation Program>

Figure 7:
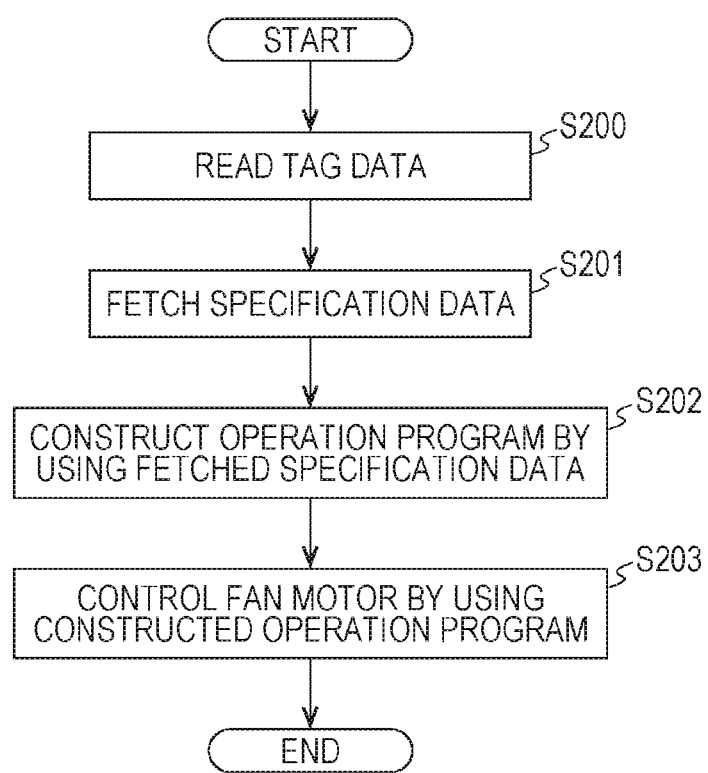
FIG. 7 is an operation flow chart illustrating a process performed by an IC tag, a microcomputer, and a motor driving unit.

FIG. 7 is an operation flow chart illustrating a process performed by the IC tag 120, the microcomputer 130, and the motor driving unit 140.

As the fan motor 100 starts operating, the tag data reading unit 132 reads the tag data stored in the tag data storing unit 124 (step S200).

Using the tag data read by the tag data reading unit 132, the operation program constructing unit 136 fetches, from the specification data stored in the specification data storing unit 134, specification data corresponding to the tag data (step S201). For example, assume that tag data A illustrated in FIG. 5 is stored in the tag data storing unit 124. In this case, the operation program constructing unit 136 fetches, from the specification data storing unit 134, the specifications (specification data) of the fan motor 100 (product) corresponding to tag data A. Specifically, as the specifications (specification data) of the fan motor 100 (product), the operation program constructing unit 136 fetches a PWM control as the speed control, a pulse sensor as the sensor to be used, and 3500 rpm as the rotation speed.

The operation program constructing unit 136 constructs an operation program using the fetched specification data (step S202). Using the specifications of the fan motor 100 (product) fetched in step S201, the operation program constructing unit 136 constructs an operation program including PWM control program+pulse sensor application program+3500 rpm control program.

The operation program constructing unit 136 (or the motor driving unit 140) controls the operation of the motor 150 by using the constructed operation program (step S203). That is, the fan 160 is rotated by the motor 150 under a PWM control up to 3500 rpm using a pulse sensor.

Now, assume that tag data B illustrated in FIG. 5 is stored in the tag data storing unit 124. In this case, the fan 160 is rotated by the motor 150 under a single speed control up to 5000 rpm using a lock sensor. Assume that tag data C is stored in the tag data storing unit 124. In this case, the fan 160 is rotated by the motor 150 under a temperature variable speed control up to 2000 rpm using a low speed sensor.

As described above, with the fan motor 100 of the present embodiment, the fan motor 100 can be set to particular specifications based on the tag data stored in the tag data storing unit 124. This allows for many specifications (3×3×3=27 specifications in the present embodiment) to be set in the fan motor 100.

Figure 8:
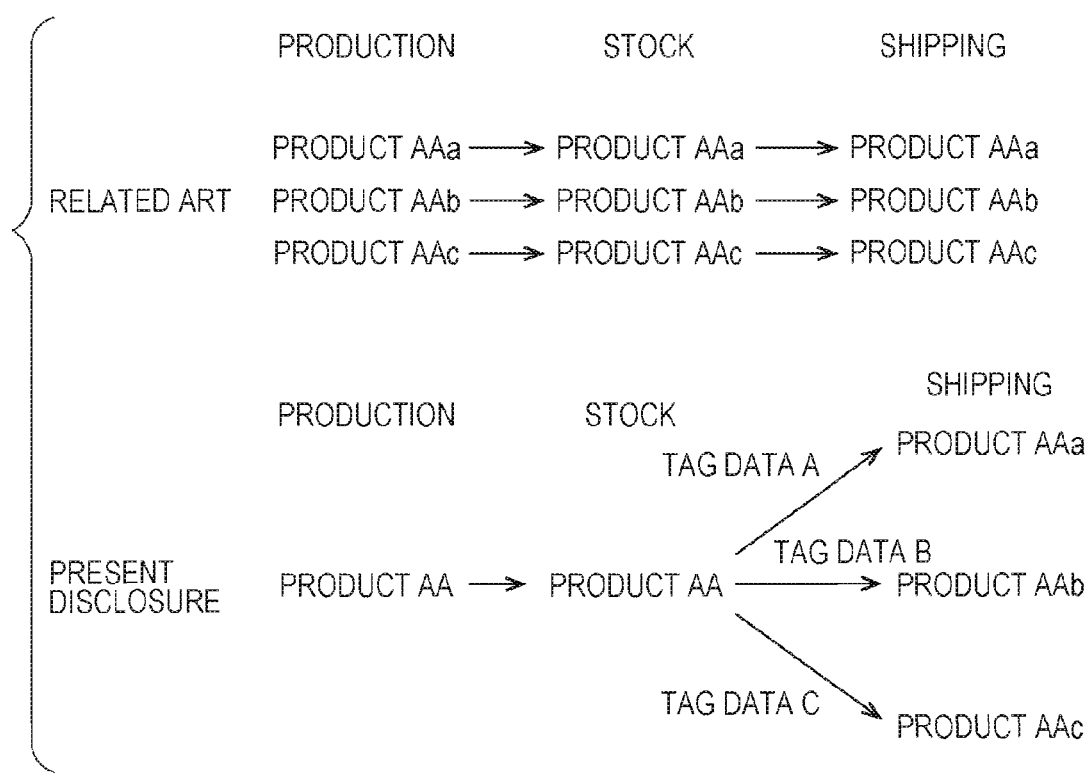
FIG. 8 illustrates an advantage of the present embodiment.

FIG. 8 illustrates an advantage of the present embodiment.

Assume that products AAa, AAb and AAc having different specifications from one another are provided, as illustrated in FIG. 8. In this case, normally, products AAa, AAb and AAc are manufactured and kept in stock in a warehouse. Then, a product having specifications requested by the customer is shipped. Therefore, there is a need to keep in stock products having three specifications. Moreover, the amount of stock further increases as the number of specifications of the product increases. A stock control is also needed so that it is possible to ship those products having specifications requested by the customer.

In contrast, according to the present embodiment, even if products AAa, AAb and AAc having different specifications from one another are to be provided, as illustrated in FIG. 8, hardware in the form of products AA is produced and kept in a warehouse. Then, before shipping products having specifications requested by the customer, one of tag data A, tag data B and tag data C is transmitted to the IC tag 120 by using the electronic tag writer 110 (see FIG. 1). Through such a simple process, it is possible to ship products AAa, AAb and AAc having different specifications from one another.

Thus, according to the present embodiment, the fan motor 100 including therein the IC tag 120 and the microcomputer 130 is produced, and tag data representing the rotation speed value, the sensor type and the speed control content is written afterward to the IC tag 120 by using the electronic tag writer 110, thereby turning the fan motor 100 into a product having intended specifications. At power-on of the fan motor 100, the microcomputer 130 reads the tag data of the IC tag 120 (the tag data storing unit 124). Thus, the fan motor 100 operates according to the product specifications.

Therefore, fan motors of the same hardware configuration can be used even when producing fan motors having many specifications different from one another. This makes it possible to reduce the amount of stock of the fan motors. As the amount of stock is reduced, the stock control is made easier, and it is also possible to shorten the production lead time.

Note that in the above described temperature variable speed control, for example, the fan motor 100 is controlled to be at 0 rpm at 0° C., 3000 rpm at 20° C., 4000 rpm at 40° C., or 5000 rpm at 50° C.

The present embodiment illustrates a fan motor as a device carrying the product specification setting apparatus thereon. However, the device carrying the product specification setting apparatus thereon is not limited to this as long as it is a product that can make use of the technical philosophy of the present embodiment.

The specification data stored in the specification data storing unit 134 is not limited to data illustrated in the embodiment described above. For example, various control specifications as follows may be stored in the specification data storing unit 134 as control data (specification data).

Control specifications for arbitrarily setting voltage range to be used (for example, 13.8 V at maximum or 15.0 V at maximum);

Control specifications for varying rotation speed over time (for example, 5000 rpm until elapse of four hours→then, 2000 rpm until elapse of one hour→then, 5000 rpm until elapse of four hours; or 5000 rpm until elapse of three minutes→then, 0 rpm until elapse of three minutes→then, 5000 rpm until elapse of three minutes).

The device carrying the product specification setting apparatus thereon may be a device capable of obtaining temperature data from a temperature sensor of a client device so as to adjust the cooling power. With such a device, a microcomputer writes, to an IC tag, the temperature obtained from the temperature sensor of the client device. Moreover, a microcomputer uses an IC tag reader to read out the temperature to make an evaluation based on the temperature.

The device carrying the product specification setting apparatus thereon may be capable of storing ID information for traceability (the history of completion of various steps and/or the lot number of the finished product). Alternatively, the device carrying the product specification setting apparatus thereon may be capable of storing shipping inspection data and/or field operation status records.

Preferred embodiments of the present disclosure have been described above. However, the foregoing description is intended only for illustration of the present disclosure, and is not intended to limit the technical scope of the present disclosure to the foregoing embodiments. The technique of the present disclosure can be carried out in various modes different from the foregoing embodiments without deviating from the gist of the present disclosure.

Note that in the present embodiment, the tag data writing unit 122 is configured to write, to the tag data writing unit 122 itself, the specifications of the fan motor 100 output from the electronic tag writer 110. Alternatively, the tag data writing unit 122 may write the specifications of the fan motor 100 output from the electronic tag writer 110 to the other member in the IC tag 120. In such a case, the tag data storing unit 124 stores the specifications written in the other member. The tag data writing unit 122 may write the specifications of the fan motor 100 output from the electronic tag writer 110 to the tag data storing unit 124.

The microcomputer 130 may be configured to use the specifications of the fan motor 100 stored in the IC tag 120 for updatably storing the specifications of the fan motor 100 so as to control the motor 150 for driving the fan 160 based on the specifications. The motor driving unit 140 may be configured to drive the motor 150 under a control of the microcomputer 130 based on the specifications.

When setting such specifications as illustrated in FIG. 3, tag data A may be created, defining X=1, Y=a and Z=β.

Through the process of S100 to S103, the specifications of the fan motor 100 may be specifications of the fan motor 100 corresponding to tag data A, defining PWM control as the speed control, pulse sensor as the sensor to be used, and 3500 rpm as the rotation speed.

When tag data B illustrated in FIG. 5 is transmitted from the electronic tag writer 110, the specifications of the fan motor 100 may be the specifications of the fan motor 100 in which each of a single speed control as the speed control, a lock sensor as the sensor to be used, and 5000 rpm as the rotation speed is set. When tag data C illustrated in FIG. 5 is transmitted from the electronic tag writer 110, the specifications of the fan motor 100 may be the specifications of the fan motor 100 in which each of a temperature variable speed control as the speed control, a low speed sensor as the sensor to be used, and 2000 rpm as the rotation speed is set.

Embodiments of the present disclosure may include first to fifth product specification setting apparatuses and first to tenth fan motors as follows.

A first product specification setting apparatus includes an electronic tag for updatably storing specifications of a product, and a control computer using the stored specifications of the product to control the product based on the specifications.

A second product specification setting apparatus according to the first product specification setting apparatus further includes an electronic tag writer for outputting specifications of the product in order to update the specifications of the product stored in the electronic tag.

In a third product specification setting apparatus according to the second product specification setting apparatus, the electronic tag includes a tag data writing unit for writing the specifications of the product output from the electronic tag writer, and a tag data storing unit for storing the written specifications of the product.

In a fourth product specification setting apparatus according to the third product specification setting apparatus, the specifications of the product are output from the electronic tag writer to the tag data writing unit as tag data via a wired connection or a wireless connection.

In a fifth product specification setting apparatus according to the third or fourth product specification setting apparatus, the control computer includes: a tag data reading unit reading the tag data stored in the tag data storing unit; a specification data storing unit for storing specification data corresponding to the tag data; and an operation program constructing unit for fetching, from the specification data stored in the specification data storing unit, specification data corresponding to the tag data read by the tag data reading unit so as to construct an operation program for the product by using the fetched specification data.

A first fan motor includes an electronic tag for updatably storing specifications of the fan motor, a control computer using the stored specifications of the fan motor to control the motor for driving the fan based on the specifications, and a motor driving unit for driving the motor under a control of the control computer based on the specifications.

In a second fan motor according to the first fan motor, an electronic tag writer for outputting specifications of the fan motor is used to update the specifications of the fan motor stored in the electronic tag.

A third fan motor according to the second fan motor includes a tag data writing unit for writing specifications of the fan motor output from the electronic tag writer, and tag data storing unit for storing the written specifications of the fan motor.

In a fourth fan motor according to the third fan motor, the specifications of the fan motor are output from the electronic tag writer to the tag data writing unit as tag data via a wired connection or a wireless connection.

In a fifth fan motor according to the third or fourth fan motor, the control computer includes a tag data reading unit for reading the tag data stored in the tag data storing unit, a specification data storing unit for storing specification data corresponding to the tag data, and an operation program constructing unit for fetching, from the specification data stored in the specification data storing unit, specification data corresponding to the tag data read by the tag data reading unit so as to construct an operation program for the fan motor by using the fetched specification data.

In a sixth fan motor according to the fifth fan motor, the specification data includes at least one of three specifications: a speed control to be applied to the fan motor, a sensor to be used in the fan motor, and a rotation speed to be applied to the fan motor.

In a seventh fan motor according to the sixth fan motor, the specification of the speed control to be applied to the fan motor includes at least one of three control contents: a single speed control, a PWM control and a temperature variable speed control.

In an eighth fan motor according to the sixth fan motor, the specification of the sensor to be used in the motor includes at least one of three sensor uses: a pulse sensor, a low speed sensor and a lock sensor.

In a ninth fan motor according to the sixth fan motor, the specification of the rotation speed to be applied to the fan motor includes at least one of three rotation speed values: a high speed, a medium speed representing a slower rotation speed than the high speed, and a low speed representing a slower rotation speed than the medium speed.

A tenth fan motor includes an electronic tag, a control computer, and a fan motor driving unit. The electronic tag updatably stores specifications of the fan motor. The control computer uses the stored specifications of the fan motor to control the fan motor based on the specifications. The fan motor driving unit drives the fan motor under a control of the control computer based on the specifications.

An eleventh fan motor includes an electronic tag for updatably storing specifications of the fan motor, a control computer for constructing an operation program for controlling the fan motor, and a motor driving unit for controlling a motor for rotating a fan by using the operation program.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A product specification setting apparatus comprising:
    an electronic tag for updatably storing specifications of a product; and
    a control computer for controlling the product according to the stored specifications,
    wherein the electronic tag includes:
    a tag data writing unit for writing, to the tag data writing unit itself, the specifications of the product input from outside; and
    a tag data storing unit for storing the specifications written in the tag data writing unit.

2. The product specification setting apparatus according to claim 1, further comprising an electronic tag writer for outputting the specifications of the product to the tag data writing unit.

3. The product specification setting apparatus according to claim 2, wherein
    the specifications of the product are output from the electronic tag writer to the tag data writing unit as tag data via a wired connection or a wireless connection to be stored in the tag data storing unit.

4. The product specification setting apparatus according to claim 3, wherein
    the control computer includes:
    a tag data reading unit for reading the tag data stored in the tag data storing unit;

a specification data storing unit for storing specification data corresponding to the tag data; and an operation program constructing unit for fetching, from the specification data stored in the specification data storing unit, specification data corresponding to the tag data read by the tag data reading unit to construct an operation program for the product by using the fetched specification data.

5. A fan device comprising:

a motor driving unit for driving a motor for rotating a fan;

an electronic tag for updatably storing specifications of the fan device; and a control computer for controlling the motor driving unit according to the stored specifications, wherein the electronic tag includes:

a tag data writing unit for writing, to the tag data writing unit itself, the specifications of the fan device input from outside; and a tag data storing unit for storing the specifications written in the tag data writing unit.

6. The fan device according to claim 5, further comprising an electronic tag writer for outputting the specifications of the fan device to the tag data writing unit.

7. The fan device according to claim 6, wherein the specifications of the fan device are output from the electronic tag writer to the tag data writing unit as tag data via a wired connection or a wireless connection to be stored in the tag data storing unit.

8. The fan device according to claim 7, wherein the control computer includes:

a tag data reading unit for reading the tag data stored in the tag data storing unit;

a specification data storing unit for storing specification data corresponding to the tag data; and an operation program constructing unit for fetching, from the specification data stored in the specification data storing unit, specification data corresponding to the tag data read by the tag data reading unit to construct an operation program for the fan device by using the fetched specification data.

9. The fan device according to claim 8, wherein the specification data includes at least one of three specifications: a speed control to be applied to the fan device, a sensor to be used in the fan device, and a rotation speed to be applied to the fan device.

10. The fan device according to claim 9, wherein the specification of the speed control includes at least one of three control contents: a single speed control, a PWM control, and a temperature variable speed control.

11. The fan device according to claim 9, wherein the specification of the sensor includes at least one of three sensor uses: a pulse sensor, a low speed sensor, and a lock sensor.

12. The fan device according to claim 9, wherein the specification of the rotation speed includes at least one of three rotation speed values: a high speed, a medium speed slower than the high speed, and a low speed slower than the medium speed.

\* \* \* \* \*